US005215658A

United States Patent [19]

Luby

[11] Patent Number: 5,215,658

[45] Date of Patent: Jun. 1, 1993

[54] CARTRIDGE EJECTOR DEVICE FOR FLUID COMPRESSION SYSTEM

[75] Inventor: Charles J. Luby, Pleasant Garden, N.C.

[73] Assignee: Ingersoll-Rand Company, Woodcliff Lake, N.J.

[21] Appl. No.: 844,043

[22] Filed: Mar. 2, 1992

[51] Int. Cl.[5] .................................... B01D 27/08

[52] U.S. Cl. .................................... 210/232; 210/443; 210/453

[58] Field of Search ........ 210/232, 238, 248, 350–352, 210/445, 453, DIG. 6, 443; 55/475, 478, 480

[56] References Cited

U.S. PATENT DOCUMENTS 847,518 3/1907 Shiltz .................................. 210/351
3,838,977 10/1974 Warren .............................. 210/352
4,906,365 3/1990 Baumann et al. .................. 210/453

FOREIGN PATENT DOCUMENTS 2162079 1/1986 United Kingdom ................ 210/443

*Primary Examiner*—Matthew O. Savage
*Attorney, Agent, or Firm*—Glenn B. Foster; James R. Bell

[57] ABSTRACT

A purifier chamber includes a recess formed therein. A bottom plug is in communications with the recess. A filter cartridge, including a mating surface, is insertable into the chamber into an assembled position whereby the mating surface is adjacent the bottom plug. A cartridge ejector is located proximal to the bottom plug and exerts a selective force between the bottom plug and the filter cartridge which is capable of causing axial displacement of the filter cartridge relative to the bottom plug. A contact rod, ejector piston, or spring are illustrated as three possible embodiments capable of accomplishing the desired result of ejecting the filter cartridge from the recess.

8 Claims, 3 Drawing Sheets

CARTRIDGE EJECTOR DEVICE FOR FLUID COMPRESSION SYSTEM

BACKGROUND OF THE INVENTION

This invention relates generally to a fluid compression system and more particularly to a device which permits removal of a filter in a fluid compression system.

Presently, compressed fluid systems are used to provide compressed breathing air to be used by fire fighters or underwater divers. There are typically one or more compressed fluid systems to provide breathing air for small dive shops or for single fire departments, except for the larger demand areas which may require more. The process required to compress fluid into the compressed fluid systems also compresses whatever moistures and impurities may be in the air. It is highly desirable to remove as many of these impurities present in the original air as possible prior to or during storage of the compressed air. To accomplish this purification of the air, filter cartridges are incorporated in the compressed fluid purification system. To ensure adequate operation of the filter cartridges, it is highly desirable that the filters be replaced often. One factor against a frequent replacement of the filter cartridges is the relatively high expense associated with replacement filter cartridges.

Replacement of filter cartridges in present systems is accomplished by removal of a filter cartridge cover and retraction of the filter cartridges from the chamber recess by pulling out the cartridges. If filter cartridges are left within the compressed fluid purification system without replacement for extended periods, or if the system is used in particularly caustic, hostile or humid locations, then the filter cartridges have a tendency to decay. This filter cartridge decay often reaches a point where the cartridge filter itself actually disintegrates upon removal. Under these circumstances, a portion of the filter cartridge will remain within the chamber recess while a portion will be removed. Removing the disintegrated portion of filter cartridge from the chamber recess is extremely time consuming and may actually lead to damage to the compressed fluid purification system.

The foregoing illustrates limitations known to exist in present compressor filtering devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus including a purifier chamber having a recess formed therein. A bottom plug is in communications with the recess. A filter cartridge, including a mating surface, is insertable into the chamber into an assembled position whereby the mating surface is adjacent the bottom plug. A cartridge ejector is located proximal to the bottom plug and exerts a selective force between the bottom plug and the filter cartridge which is capable of causing axial displacement of the filter cartridge relative to the bottom plug.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
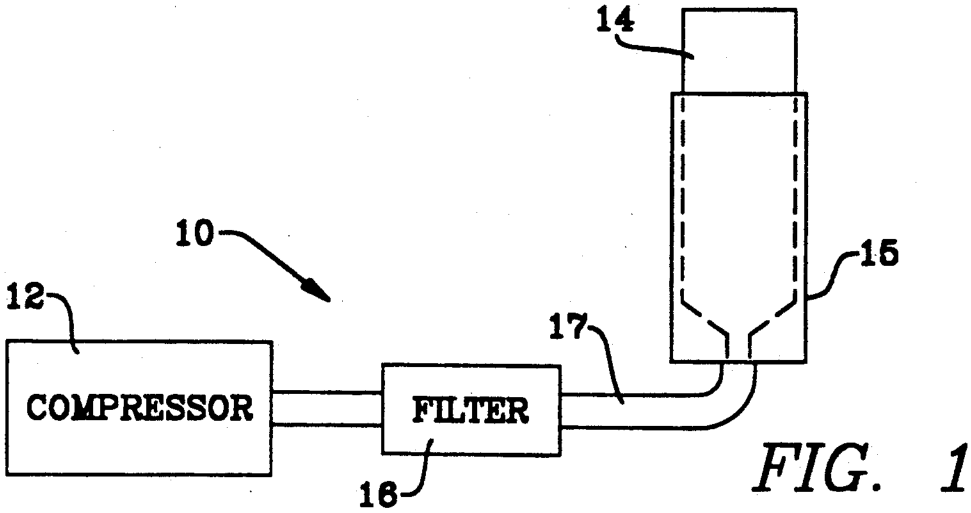
FIG. 1 is a schematic view illustrating some of the generalized components used in fluid compression systems.

A compressed fluid purification system is shown generally as 10. The compressed fluid purification system includes a compressor 12, a removable compressed fluid canister 14 which is intended to be filled with fluid from the compressor 12, and at least one filter cartridge 16 which is intended to filter out moisture and impurities from the fluid being fed to the compressed fluid canister 14. The compressed fluid canister 14 is removably positioned within a canister support in such a manner as the compressed fluid canister 14 will receive and store fluid passing from a support conduit 17. Often multiple filter cartridges 16 are connected in series. The compressed fluid canister 14 may be removable from the remainder of the compressed fluid purification system 10 whereby users of the compressed fluid would have a portable source of compressed fluid. This compressed fluid purification system is especially applicable to compressed breathing air systems as would be used by fire departments, dive shops, etc.

Figure 2:
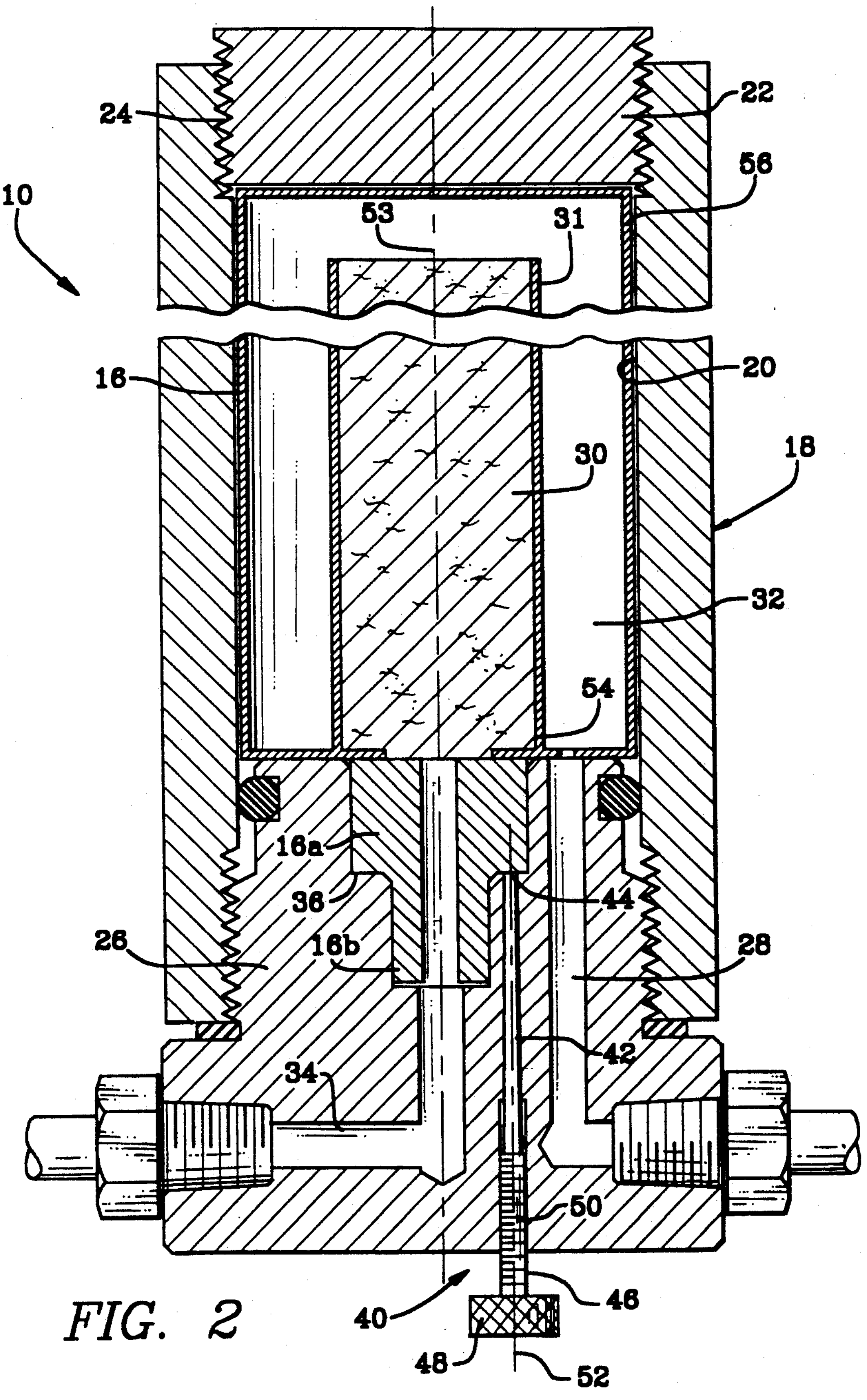
FIG. 2 is a partially cross-sectional view of a fluid purification chamber utilizing one embodiment of cartridge ejector device of the present invention.

A purification chamber 18 of the compressed fluid purification system 10 is illustrated structurally in FIG. 2. The purification chamber 18 has a recess 20 formed therein. The recess 20 is configured to receive the filter cartridge 16 therein. A filter cartridge cover 22 is securely attached to the purification chamber 18, partially defining the recess 20 and containing the filter cartridge 16 in position. A threaded connection 24 connects the filter cartridge cover to the remainder of the purification chamber. It is envisioned that alternate means of attachment may be used to connect these two members.

Also, partially defining the purification chamber 18 is a bottom plug 26. The bottom plug 26 contains porting to supply and remove air to and from the filter cartridge 16. A supply conduit 28 supplies fluid to the filter cartridge 16. A filter material portion 31 is in fluid communication with the supply conduit 28. Filter material 30 is contained within portion 31, and may be selected to remove moisture, impurities, or other elements in the fluid which is desired to remove. The portion 31 is in fluid communication with a return conduit 34 via a bore **16*b*, and with an annular recess 32, which is in turn in fluid communication with a supply conduit 28. In this manner, fluid applied through supply conduit 28 passes through the filter material 30 and through to the return conduit 34 after exiting the filter cartridge, affecting the filtering capabilities of the filter cartridge 16. A mating surface 36 of the filter cartridge 16 is formed on the snout-like projection 16***a* of cartridge 16 with bore 16*b* thereof in communication with the return conduit 34 when in an assembled position as illustrated in FIG. 2, in a manner permitting negligible leakage as the fluid passes through the filter cartridge as is well known in the art and will not be further detailed here.

Figure 4:
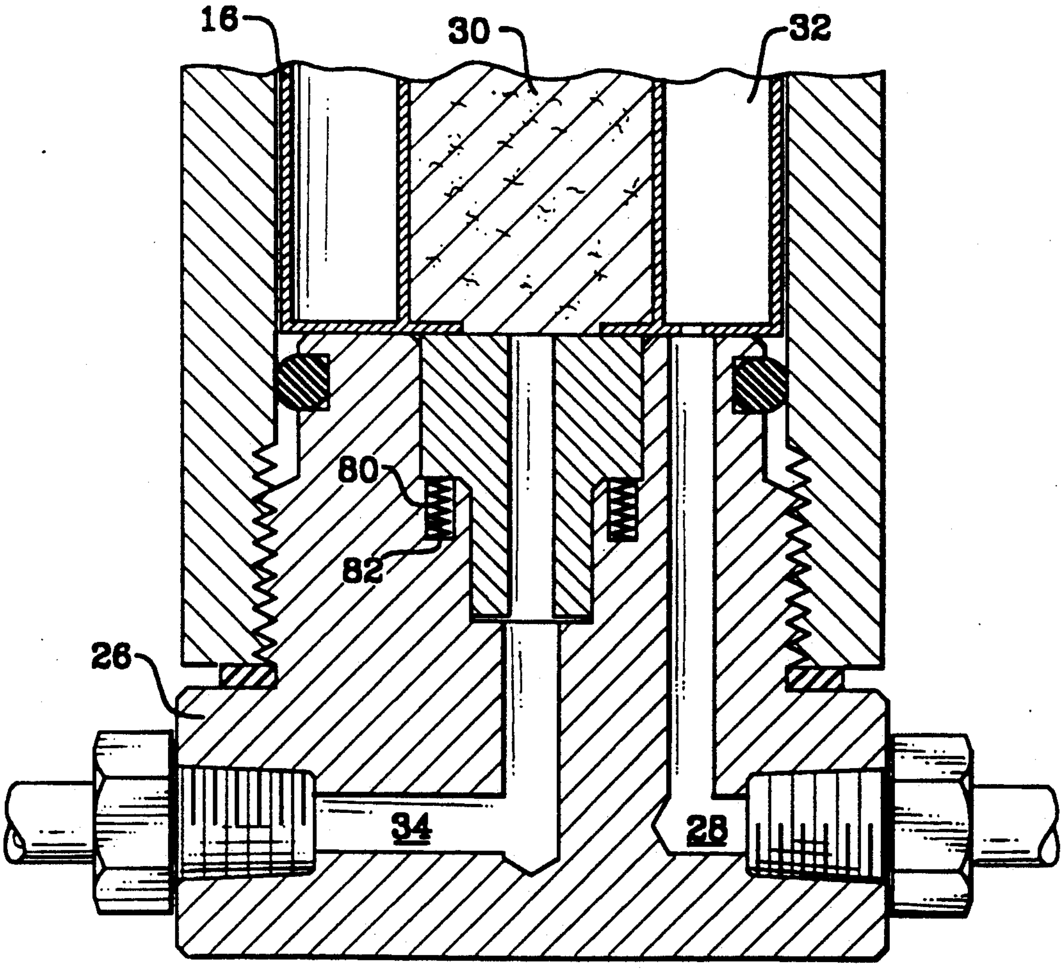
FIG. 4 is a cross-sectional view of a bottom plug and a filter cartridge of a purification chamber incorporated in another embodiment of a cartridge ejector device of the present invention.
Figure 3:
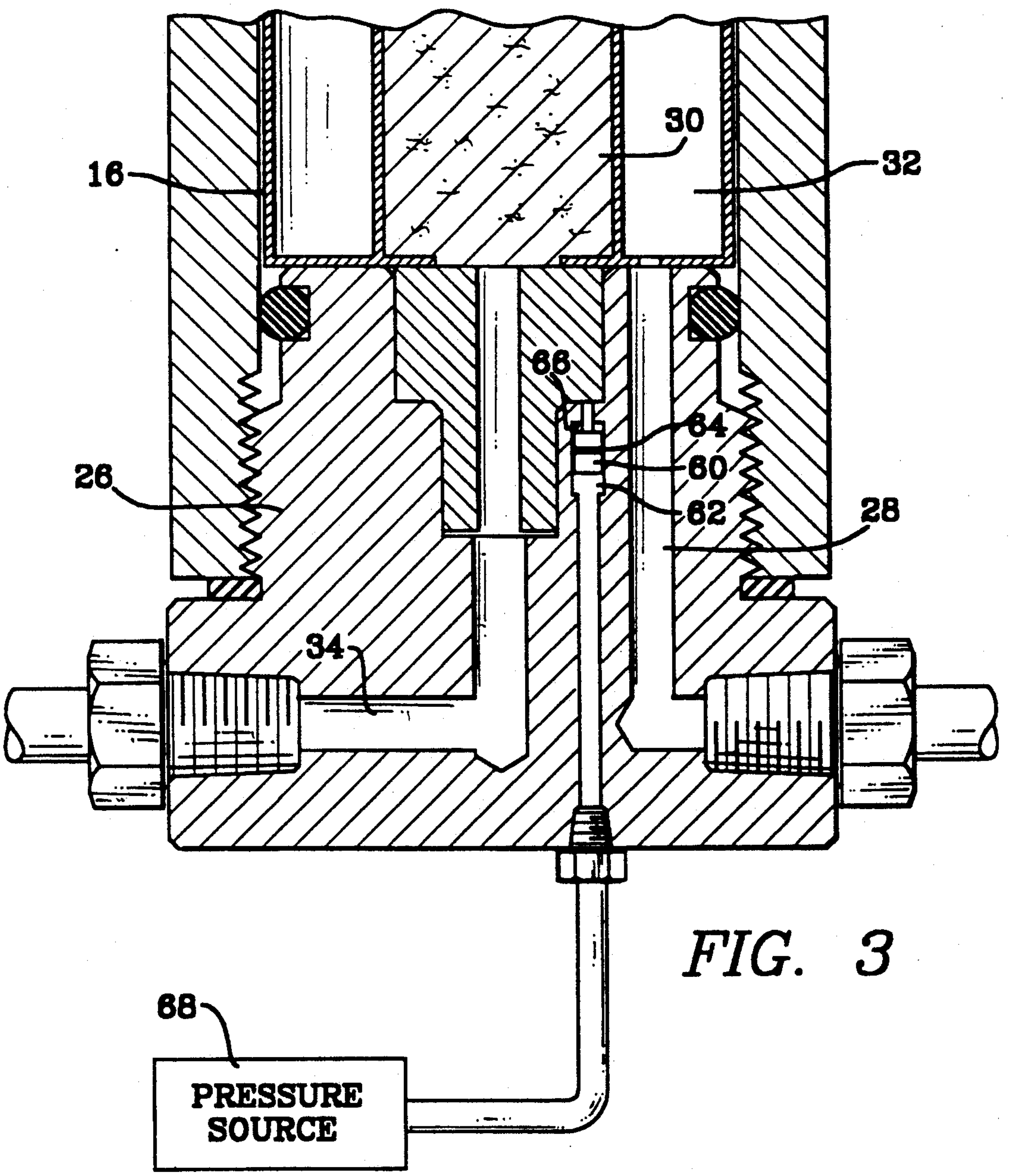
FIG. 3 is a cross-sectional view of a bottom plug and a filter cartridge of a purification chamber of a alternate embodiment of a cartridge ejector device of the present invention.

FIGS. 2, 3, and 4 illustrate different embodiments of cartridge ejectors 40. The FIG. 2 embodiment incorporates a contact rod 42 which extends through the bottom plug 26. The contact rod includes a first end 44, a second end 46, a knurled cylinder 48 affixed to the second end 46 and the mating threaded section 50 which threadingly engages the contact rod 42 to the bottom plug 26. The knurled cylinder 48 is positioned for easy access such that a person can rotate it and affect extension of the contact rod 42 in a longitudinal axis 52. The first end 44 of the contact rod 42 is configured such that when the contact rod 42 is actually displaced along the longitudinal axis 52, sufficient force may be imparted to the mating surface 36 to effect displacement of the filter cartridge 16 along the filter cartridge longitudinal axis 53.

Note that the FIG. 2 embodiment effects ejection of the filter cartridge 16 by applying force directed toward the mating surface 36 and the first cartridge end 54 instead of applying retracting force at a second cartridge end 56 of the filter cartridge 16 as is required with a prior cartridge ejector systems. Pushing the filter cartridge 16 from the assembled position within the chamber recess 20 results in a lower probability of the filter cartridge 16 disintegrating or shearing upon removal, leaving a portion thereof in the chamber recess 20. The removal of sheared filter cartridges accounts for a considerable amount of the effort and time associated with filter cartridge 16 removal.

In the FIG. 3 embodiment, an ejector piston 60 is disposed within a piston recess 62 with a piston seal 64 mounted circumferentially thereabout the ejector piston 60. A piston stop 66 is disposed within the piston recess 62 to prevent excessive displacement of the ejector piston 60 from within the piston recess. A high pressure fluid source 68 is in fluid communication with the piston recess 62 whereby the filter cartridge 16 may be removed from the chamber recess 20 by simply applying sufficient fluid from the high pressure fluid source to the piston recess 62 to cause biasing of the ejector piston 60 against the mating surface 36 of the filter cartridge 16. The pressure source may be removable or permanent, as is desired for the specific application. The pressure source may be controllable, though, so constant force is not being continually applied to the filter cartridge. This biasing must be sufficient to displace the filter cartridge 1 from the assembled position within the chamber recess 20 when the filter cartridge connection cover 22 is removed.

In the FIG. 4 embodiment, an ejector spring 80 is affixed to the bottom plug 26. Ejector spring 80 has been chosen because it exerts sufficient force to displace the filter cartridge 16 from its assembled position within the chamber recess 20 when the filter cartridge cover 22 is removed.

The spring factor of the ejector spring 80 must not be high enough to compress the filter cartridge, however. The ejector springs 80 may be configured to rest within a recess 82, or alternately may simply rest on planar surface (not shown) to exert a biasing force between the bottom plug 26 and the filter cartridge 16.

The commonality of the FIGS. 2, 3, and 4 embodiments is that sufficient biasing force is applied to the first cartridge end 54 via the mating surface 36 to effect axial displacement of the filter cartridge 16 along the filter cartridge longitudinal axis 52 which forces the filter cartridge out of the chamber recess 20.

While this invention has been illustrated and described in accordance with a preferred embodiment, it is recognized that other variations and changes may be made therein without departing from the invention as set forth in the claims.

Having described the invention, what is claimed is:

1. An apparatus comprising:

a chamber having a first and second opening, both first and second openings having connecting means formed thereat for connecting the first and second openings of the chamber to a plug and a filter cartridge cover, respectively;

said plug having a mating surface, and insertable in the first opening and connectable thereto by the connecting means, the plug having both an inlet and outlet communicating with the chamber;

a filter cartridge, having a mating surface, and containing filter material within its fixed confines, the cartridge being insertable into the second opening of the chamber to have its mating surface rest on the mating surface of the plug;

said filter cartridge cover being insertable into the second opening of the chamber and engagable with the connecting means at the second opening, the cover retaining the filter cartridge within the chamber after the filter cartridge has been inserted therein and;

cartridge ejector means extending through the mating surface of the plug and contactingly engagable with the mating surface of the filter cartridge for exerting a force on the mating surface of the filter cartridge capable of causing displacement of the filter cartridge from the chamber when the cover is removed.

2. An apparatus as in claim 1, wherein the cartridge ejector means include a contact rod displaceable in the axial direction of the purifier chamber, the contact rod being capable of contacting and displacing the filter cartridge.

3. An apparatus as in claim 2, further comprising:

a threaded section displaceably connecting the contact rod relative to the plug.

4. The apparatus as described in claim 2, wherein the contact rod extends through the plug.

5. The apparatus as described in claim 1, wherein the cartridge ejector means further comprises:

an ejector piston which is biased by fluid pressure against said mating surface of the filter cartridge.

6. The apparatus as described in claim 5, wherein the ejector piston is at least partially displaceably mounted within the plug.

7. The apparatus as described in claim 1, wherein the cartridge ejector means further comprises:

an ejector spring biased between the mating surface of the filter cartridge bottom plug.

8. The apparatus as described in claim 7, wherein the ejector spring is affixed to the plug.

* * * * *